United States Patent
Thörner

(10) Patent No.: US 7,606,713 B2
(45) Date of Patent: Oct. 20, 2009

(54) INTELLIGENT PERIPHERAL FOR SPEECH RECOGNITION IN NETWORKS

(75) Inventor: Jan Bengt Kenneth Thörner, Upplands Väsby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 838 days.

(21) Appl. No.: 10/525,586

(22) PCT Filed: Aug. 30, 2002

(86) PCT No.: PCT/EP02/09822

§ 371 (c)(1),
(2), (4) Date: Sep. 19, 2005

(87) PCT Pub. No.: WO2004/021688

PCT Pub. Date: Mar. 11, 2004

(65) Prior Publication Data
US 2006/0100884 A1    May 11, 2006

(51) Int. Cl.
G10L 15/22 (2006.01)
G10L 15/28 (2006.01)

(52) U.S. Cl. .......... 704/270.1; 704/275; 379/88.01; 379/88.03; 726/15

(58) Field of Classification Search ............ 704/270, 704/270.1, 273, 275; 379/88.01, 88.03; 726/15
See application file for complete search history.

(56) References Cited

U.S. PATENT DOCUMENTS

| | | | | |
|---|---|---|---|---|
| 5,764,735 A * | 6/1998 | Thorner | ............ | 379/93.07 |
| 6,233,234 B1 * | 5/2001 | Curry et al. | ............ | 370/356 |
| 6,317,484 B1 * | 11/2001 | McAllister | ............ | 379/88.02 |
| 6,363,150 B1 * | 3/2002 | Bhagavath et al. | ............ | 380/225 |
| 6,449,474 B1 * | 9/2002 | Mukherjee et al. | ............ | 455/414.2 |
| 6,463,443 B1 * | 10/2002 | Thorner et al. | ............ | 707/104.1 |
| 6,574,599 B1 * | 6/2003 | Lim et al. | ............ | 704/270 |
| 6,690,772 B1 * | 2/2004 | Naik et al. | ............ | 379/88.03 |
| 6,693,878 B1 * | 2/2004 | Daruwalla et al. | ............ | 370/235 |
| 6,751,308 B1 * | 6/2004 | Sahala | ............ | 379/225 |
| 6,879,680 B2 * | 4/2005 | Donovan et al. | ............ | 379/220.01 |
| 7,085,827 B2 * | 8/2006 | Ishizaki et al. | ............ | 709/223 |

(Continued)

FOREIGN PATENT DOCUMENTS

WO        WO 01 35617 A        5/2001

(Continued)

OTHER PUBLICATIONS

Bosco P G et al: "An intelligent network test-bed for service design, validation and execution" Digital Communications, 1992. 'Intelligent Networks and Their Application.' Proceedings., 1992 International Zurich Seminar on Zurich, Switzerland Mar. 16-19, 1992, New York, NY USA, IEEE, US Mar. 16, 1992, pp. B2-1-B216, XP010063503 ISBN: 0-7803-0625-2 figure 10 paragraph '0005!

*Primary Examiner*—Martin Lerner

(57) ABSTRACT

A telecommunication network with an intelligent peripheral that is provided with a processor and a memory, as well as speech recognition functionality. The memory stores a list of VPN-addresses of at least one of a set of persons, personal functions, specific terminals and services. The telecommunication network also has a switch and a network apparatus. The intelligent peripheral provides for speed recognition and is provided as an add-on in the network.

16 Claims, 6 Drawing Sheets

U.S. PATENT DOCUMENTS

| | | | |
|---|---|---|---|
| 7,139,387 B2 * | 11/2006 | Dahari | 379/229 |
| 7,177,402 B2 * | 2/2007 | Metcalf | 379/88.03 |
| 7,181,400 B2 * | 2/2007 | Cohen et al. | 704/275 |
| 2002/0052912 A1 * | 5/2002 | Griswold et al. | 709/200 |
| 2002/0064149 A1 | 5/2002 | Elliott et al. | |
| 2003/0055652 A1 * | 3/2003 | Nichols et al. | 704/275 |
| 2003/0088697 A1 * | 5/2003 | Matsuhira | 709/238 |
| 2004/0158705 A1 * | 8/2004 | Burdett et al. | 713/151 |

FOREIGN PATENT DOCUMENTS

| | | |
|---|---|---|
| WO | WO 01 73750 A | 10/2001 |
| WO | WO 02 43362 A | 5/2002 |

\* cited by examiner

INTELLIGENT PERIPHERAL FOR SPEECH RECOGNITION IN NETWORKS

FIELD OF THE INVENTION

The present invention relates in general to a method for providing speech recognition and in particular for providing speech recognition as an add-on to a telecommunications network.

PRIOR ART

Voice dialing in mobile telephones has been a success, and this feature is rated as one of best and innovative features in new handsets. Since some years, a number of mobile telephones include Speech Recognition (SR). SR in mobile telephones facilitates performing of good SR-quality as it could be implemented as speaker-dependent since, most of the time, only one user uses the mobile telephone.

SR implemented in networks, however, is more difficult to perform, as a SR service in a network must be able to be used by many users, and, consequently, then, the SR service must be speaker-independent. SR in networks exists in some implementations today, but the trend is that it now starts to be commodity for many applications. Important to consider is that SR in mobile telephones (or other telecommunication apparatus) and SR in networks do not compete, as they cover different user needs.

SR in mobile telephones is of a personal nature. The user enters mostly his/her own colleagues, relatives, and friends with names or sometimes with nicknames in the memory of the mobile telephone. Moreover, sometimes some names of companies, shops, etc. which are frequently called are entered into the memory of the mobile telephone. However, the whole catalogue of worldwide companies, people, etc. is not entered due to practical and technical reasons. One could say that SR in mobile telephones serves a calling party with his/her personal needs. Of importance is also that the user of the mobile telephone is responsible for service management, i.e., to keep the entered list of names in the memory of the mobile telephone updated with relevant information.

Nowadays, for technical reasons, mobile telephones lack features such as:
  speaker independent SR
  large vocabulary
  speaker verification
  "natural language" design
  designing easy to use and intuitive speech interfaces and
    dialogs is very demanding and requires special experience and knowledge about human behavior. Doing this on a network scale would make sense, however, it is very difficult to do this on a very wide scale.

Apart from SR in mobile telephones, SR is to some extent integrated in network products. Examples of deployed speech driven services nowadays are:
  operator services
  automated handling of collect call
  automated directory inquiries
  automated call routing
  value added services
  voice announcement application
  voice activated dialing.

To build up an Intelligent Network (IN) system in a network to introduce IN based services is
  expensive
  time consuming This is also true for making changes in the IN system, working in the traditional way, including introduction of SR. Therefore, the ideal situation is if we can find a way when a new feature can be introduced with minimum needs (or no needs) for updating the IN system, hence the introduced new feature should be substantially transparent for the existing IN-system.

This invention makes it possible to introduce SR in an existing network, with minimal changes to the IN system. Upon that, the invention facilitates the use of SR, making it possible to talk in plain text with the system, not having to remember- or looking up telephone numbers or email addresses.

SUMMARY OF THE INVENTION

In this description, the service VPN is used as an example. The invention is, however, applicable to all IN based services (2G) and all 3G services where the user makes a call or sends an email to either a person, place or terminal or service. Examples of IN based services (2G) at state of the art networks today, where the invention can be used are Freephone (also known as 800-service), Premium rate (also known as 900-service), UPT, Credit Call, Televoting, 3G services, etc. Combinations are also allowed and shows the strength of the invention, as when UPT and VPN are combined, by building up a private VPN network, where all members are persons with individual UPT-addresses.

The present invention provides an intelligent peripheral as claimed in claim 1. Such an intelligent peripheral can be easily developed. Intelligent peripherals are already on the market and need only be amended with the functionality according to the present invention. They perform the speech-to-VPN-address transition for the network apparatus that controls the switch in the telecommunication network. In that sense, the intelligent peripheral is an easy add-on, installed substantially transparent to the existing network. There is no need to either change the network apparatus or the switch heavily. The network apparatus and the switch need only be programmed to communicate with the intelligent peripheral. No new standards are necessary for either the network apparatus or the switch, which is considered as an operational advantage for the network provider in reducing the threshold for deployment of the invention. In an embodiment, the intelligent peripheral stores VPN-addresses including at least one of the following sets: private persons, personal functions (as people's roles, my dentist, my plumber, my bank man, "grandmother", . . . ), specific terminals or services. The intelligent peripheral translates the spoken name of the persons, personal functions, specific terminals or services into a corresponding code of said person, function, terminal or service. These codes represents the person, function, terminal or service and are transferred to the network apparatus which translates them into the current place or terminal where the person, personal function, terminal or service are reached, like the fixed telephone addresses, mobile telephone addresses, e-mail addresses, and facsimile addresses. Then, this intelligent peripheral can easily be used for all kinds of telecommunication apparatus, like fixed telephones, mobile telephones, personal computers, lap tops, palm tops, personal digital assistants, facsimile machines, etc., provided that they are provided with a microphone to receive speech instructions from a user.

The present invention also relates to a telecommunication network.

In such a network, speech recognition may have the following advantages:

it is easy to use, user-friendly during use and easy to access from any telecommunications apparatus;

it's use can be an alternative (and is not necessarily a substitute) to existing user interfaces;

it is user-independent;

it may have a good probability of success. That is it may be implemented in such a way that it provides a good hit rate for speech recognition. It could work in the most common environments for the users, taken into account background noise, etc. It can be used with most widely used telecommunication apparatuses, like GSM telephones, fixed telephones, IP-telephony (as well as mobile telephony using UMTS, GPRS, etc. etc.). Moreover, since it is supporting the network apparatus that is controlling the switch, the speech recognition can be used in most common 2G and 3G networks, like GSM, PSTN, ISDN, and IP-networks.

It may clear the path for other SR services because it may provide good quality, easiness to use and create a habit among users regarding SR.

It may provide a very quick response time in the order of two seconds.

As said above, VPN is one possible service, used here as an example. The list of services where this concept may be used is not limited.

Since the intelligent peripheral may be provided as an add-on to the network apparatus within an IN-system or anywhere else in a network, the existing functionality of the network apparatus in the network and the network itself is maintained. For instance, the network apparatus may, as in the prior art, provide services like divert, voicemail, etc.

In one embodiment, the telecommunication network may support a Parlay/OSA API architecture. Then, to that end, the network apparatus comprises a Service Capability Server (SCS) arranged to control the switch, and at least one application server connected to the SCS, the intelligent peripheral being also connected to the SCS and the application server.

In another embodiment, the telecommunication network supports an intelligent network (IN) architecture. Then, the network apparatus may comprise a SCP arranged to control the switch, the intelligent peripheral being also connected to the service control point. In still another embodiment, in an IN architecture, the UPT service may be used, with support of the invention in combination with information on actual location of a user, to provide location dependent switching. A user calling for a person with a certain profession, e.g. a dentist, will be connected to the closest dentist in the actual neighborhood of the user, by requesting for "A dentist" instead of "My dentist", which would be addressed as the user's dentist, probably residing in the user's hometown.

Finally, the invention relates to a data carrier provided with such a computer program product.

Below, the invention will be illustrated with reference to some figures which are only examples and not intended to limit the scope of protection as claimed.

DESCRIPTION OF EMBODIMENTS

Figure 1:
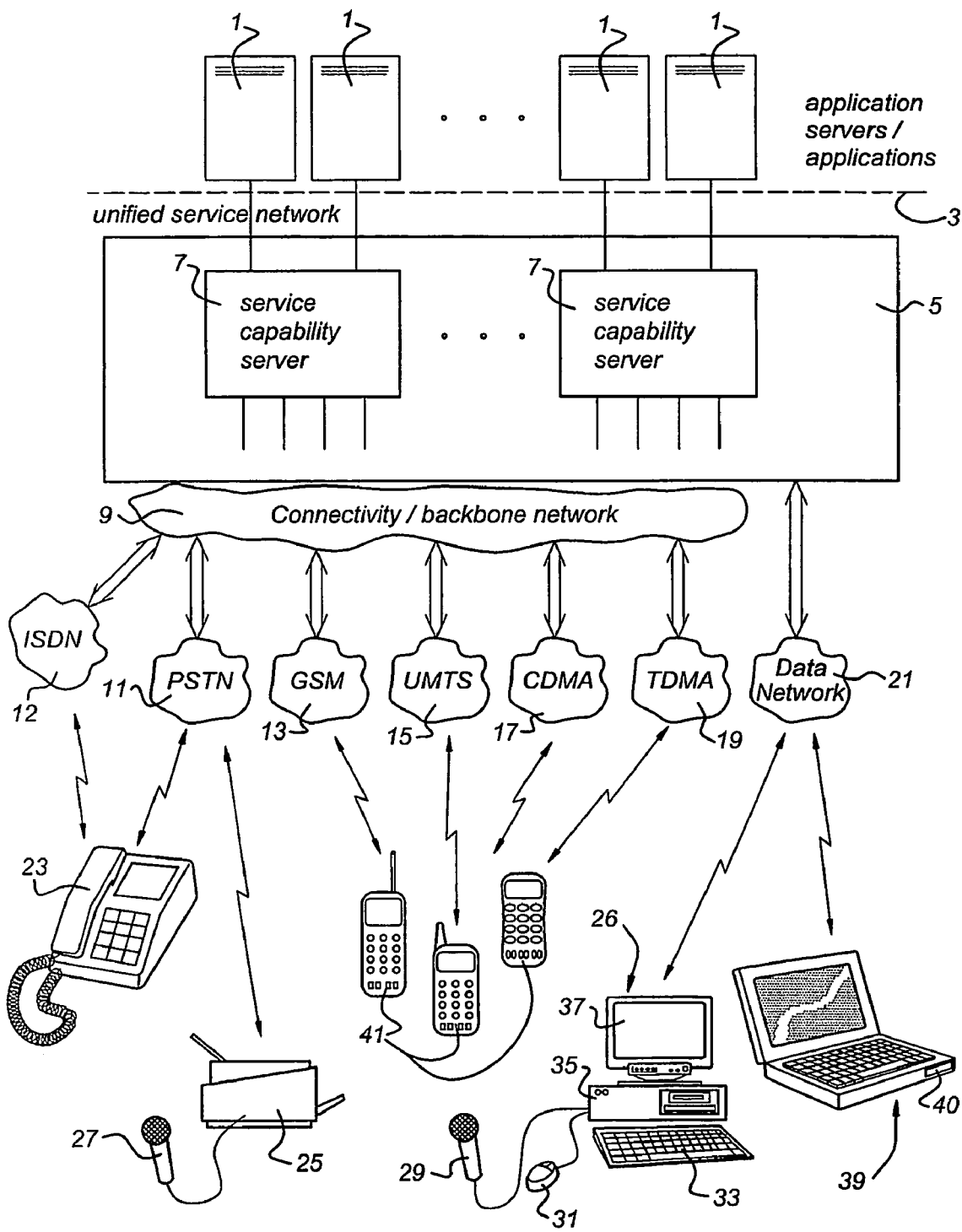
FIG. 1 shows one example of a network structure in which the invention may be applied.

The evolution of intelligent capabilities in conventional switched networks and data networks has generated opportunities to expose control of many telecommunication network capabilities to enterprises outside of the network operators domain. Historically, these capabilities have been exclusively under the control and exploitation of the network operators themselves. This has particularly been as a result of incompatible standards but also to ensure network security and integrity. This has resulted in:

network centric communications service delivery mechanisms (e.g., AIN=Advanced Intelligent Network and IN=Intelligent Network), which run "in" the network domain but generally cannot access data in the enterprise domain for critical decision making;

"edge of network" service delivery mechanisms (e.g., enterprise Computer-Telephony Integration (CTI)) which run outside the network domain but generally cannot access critical information and resources or capabilities within the network.

As to the network centric approach the following is observed. This is an excellent approach for simple mass-market applications. The services are relatively easy to manage and they can be built in a very robust fashion. The disadvantages of this architecture in the modern market place are significant, as already observed in the introduction. For example, because the network operator is responsible for the creation and operation of all applications it is difficult to achieve the necessary flexibility to deploy many customized versions of services to different customer groups. Also the time-to-market for new applications is too long. This is due to the prolonged application development phase plus the requirement of network operators for extensive integration testing. Both these phases are long because the specialist software developers and the network operators apply rigorous quality control to ensure both the robustness of the new application and avoid any adverse impact on existing network services.

As to the edge of network approach the following is observed. This approach is good for providing customized services to meet the specific needs of a customer. However, often the ability to use information or resources within the network domain would provide a more efficient solution than an edge of network approach, e.g., calls are often unnecessarily "tromboned" to and from edge of network devices.

Here, an arrangement is proposed that combines the benefits of the network centric approach of economies of scale and reliability, and those of the edge of network approach with its inherent flexibility.

In the arrangement as proposed, the application may be built, tested and operated by enterprises outside of the network domain. However, like in the network centric approach, access to network information and resources (e.g., like IVR's) and control of network capabilities are available to the enterprise domain.

Two approaches will be illustrated hereinafter as examples only. The first approach is a Parlay/OSA API (OSA=Open System Architecture, API=Application Programming Interface), embodiment whereas the second approach is an IN embodiment.

Parlay/OSA API Embodiment

In the Parlay/OSA API Architecture (which is next generation network architecture) an Application Programming Interface resides between an application layer and a service component layer as illustrated in FIG. 1.

FIG. 1 shows a network architecture with a plurality of application servers/applications 1. They are arranged to communicate with a unified service network 5. The connections may be physical connections, however, they may also be based on wireless connections. Between the unified service network 5 and the application servers/applications 1 there is an Application Programming Interface (API) 3.

The unified service network 5 comprises one or more service capability servers 7. These service capability servers 7 are all connected to one or more of the application servers/applications 1, as shown.

The unified service network 5 is also connected to a connectivity/backbone network 9 providing different network protocols to connect to a plurality of access networks. The access networks may comprise one or more of the following, i.e. all 2G and 3G networks are relevant:

PSTN 11 (Public Switched Telephone Network);
ISDN 12 (Integrated Services Digital Network)
GSM 13 (Global System for Mobile Communications);
UMTS 15 (Universal Mobile Telecommunications System);
CDMA 17 (Code Division Multiple Access);
TDMA 19 (Time Division Multiple Access);
Data Network 21

Of course, other access networks (also those to be developed in the future) may be provided in the network architecture of FIG. 1.

Each of the access networks 11-21 is "connected" to a plurality of telecommunication devices. Again, these connections may be physical connections (like copper wire or glass fibers) or wireless. FIG. 1 shows some examples of telecommunication devices widely used, e.g., a fixed telephone 23, a facsimile machine 25, a personal computer 26, a laptop 39, and one or more mobile telephones 41.

In accordance with the invention, each one of the telecommunication devices is provided with a microphone. The facsimile machine 25 is shown to be provided with a separate microphone 27, whereas the personal computer 26 is also provided with a separate microphone 29. However, these microphones 27-29 may be integrated in the facsimile machine and the personal computer 26, respectively. The laptop 39 is also provided with a microphone 40, however, this is shown to be integrated with the apparatus itself.

The personal computer 26 is further shown to comprise box 35 that is provided with the intelligence (processor), the memories and the disc drives, etc., as is known to a personal skilled in the art, a monitor 37, a keyboard 33 and a mouse 31. Of course, other internal and external devices extending the capabilities of the personal computer 26 may be provided, as is known to a person skilled in the art.

By enabling access to network capabilities via the Parlay/OSA API, service providers, independent software venders and other developers in the IT (Information Technology) and telecommunication industries are empowered to generate a new range of applications that benefit from, add value to, functionality resident in public and/or private communications networks. The Parlay/OSA API does not need to directly open up the networks signaling of public users. Rather, network capabilities that are useful to enterprise business applications can be encapsulated and may be visible in a manner that maintains the integrity, performance and security of networks. Network integrity protection is an integral part of the Parlay/OSA API design and implementation. Only by achieving high integrity with deployed API's will the operation of applications in the enterprise domain be effectively prevented from impacting existing network-hosted applications. New applications can be developed to meet the needs of a particular customer group and can be tested in isolation from existing network applications, thus, enabling both rapid development and flexibility.

The Parlay/OSA API specifications are provided by the Parlay group which, nowadays, consists not only of the major telecom network suppliers but also of major IT vendors, as well as of the operators including Ericsson, British Telecom, France Telecom, AT&T, CSELT, Siemens, Nokia, Alcatel, Lucent, Fujitsu, IBM, Cisco, Compaq, Hewlett Packard, Microsoft, Logica, and others. These specifications are in the public domain and are, e. g., available on the Internet.

The current Parlay specification addresses call control, messaging, security, wireless services and IP (Internet Protocol) services. It is an open and technology-independent specification. The specification is based on an architecture with two categories of interfaces: service interfaces and framework interfaces.

The services interfaces offer access to network capabilities and information. In phase 2 of the development of Parlay/OSA API, these interfaces are restricted to generic, enhanced, conference, multi-media, INAP1 (Intelligent Network Application Part) and CAP (Competitive Access Provider) call control, generic messaging, generic user interaction, collectivity management, location and user status services.

The framework interfaces provide the supporting capabilities necessary for the service interfaces to be secure, resilient, located and managed: authentication, authorization, service discovery, event notification, integrity management, heart beat mechanism, logging, auditing, service registration and subscription.

The Parlay/OSA interface provides access to the network-held information and capabilities but by carefully encapsulating them in capability features and forcing the access to be integrated with its framework mechanisms, it ensures the network's integrity and safety.

The Parlay interface is, thus, well suited to bind the service network together with the connectivity/backbone network 9 to give the service network a secure access to the access networks.

Figure 2:
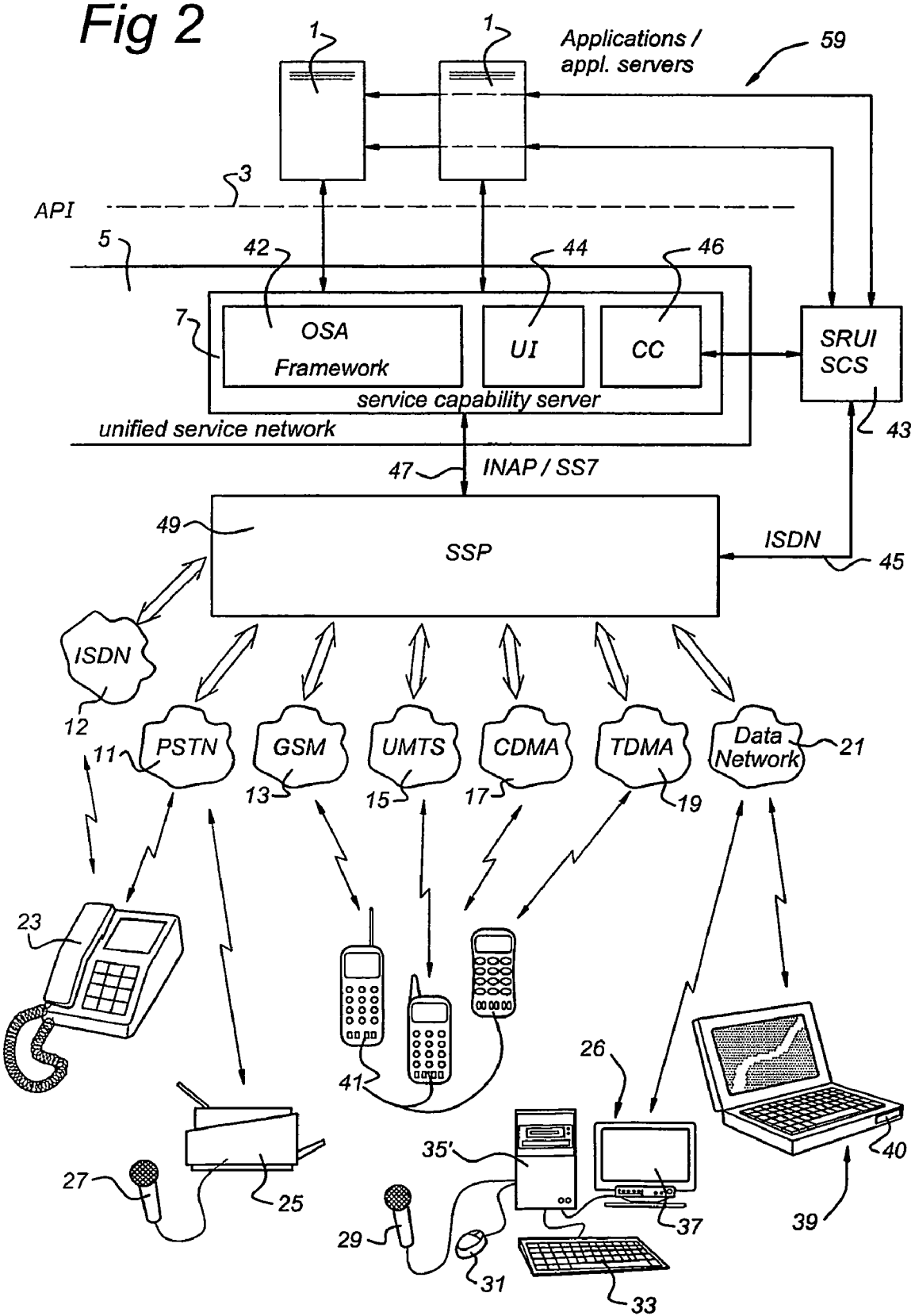
FIGS. 2 and 3 show embodiments of the invention.

FIG. 2 shows an embodiment of the invention. In accordance with the invention an intelligent peripheral in the form of a Speech Recognition User Interaction Service Capability Server 43 (SRUI SCS) is provided. In the embodiment shown in FIG. 2, in which the same reference numbers as in FIG. 1 refer to the same components as in FIG. 1, the SRUI SCS 43 is connected to one service capability server 7. This service capability server 7 may be a Jambala service capability server marketed by Ericsson. This services capability server 7 comprises an open system architecture (OSA) framework 42, a user interaction unit 44, and a call control unit 46.

FIG. 2 shows a service switching point (SSP) 49 provided in the connectivity/backbone network 9 (cf. FIG. 1).

The SRUI SCS 43 is connected via a connection 45 with the SSP 49, and with one or more of the application servers/applications 1 that are connected to the service capability server 7 via a connection 59. The connection 45 between the SSP 49 and the SRUI SCS 43 is preferably an ISDN connection. However, any other suitable connection may be provided instead. The SSP 49 is connected via a connection 47 to the service capability server 7 via, preferably, an INAP/SS 7 link (Intelligent Network Application Protocol/CCITT Signaling System number 7). These connections may be physical or wireless.

The OSA framework 42 offers Parlay authentication, access, initial and registration services.

The user interface UI 44 offers the Parlay generic user interaction services. The call control CC 46 offers the Parley generic call control services.

The SRUI SCS 43 is an intelligent peripheral that is arranged to communicate with the application servers/applications 1, the call control CC 46, and the service switching point SSP 49. It can be provided as a separate box with the appropriate input and output connections to the others components shown. Therefore, the SRUI SCS 43 does not demand any physical change to the Parlay/OSA API architecture as shown in FIG. 1. The only amendment needed is that the application servers/applications 1, the call control CC 46, and the SSP 49 need by provided with appropriate functionality to allow communications with the SRUI SCS 43 to provide the required functionality.

The SRUI SCS is arranged such that it provides the Parlay user interaction service with text-to-speech and speech recognition functions. The order of the functioning may be as follows.

Figure 4:
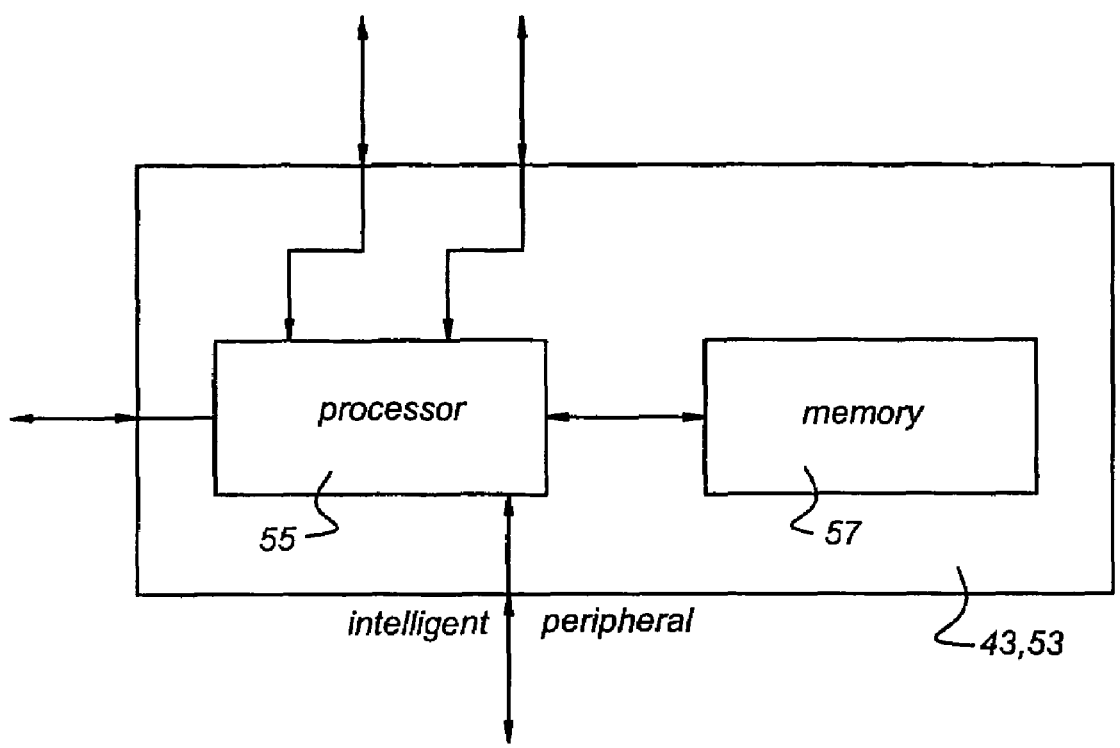
FIG. 4 shows a schematic diagram of an intelligent peripheral.

An incoming call from a party A desiring to reach a party B is reported from SSP 49 to call control CC 46. The CC 46 informs one of the application servers/applications 1. That application server/application 1, then, asks the SRUI SCS 43 to perform a speech recognition operation. The SRUI SCS 43 is provided with a processor (or a plurality of processors) (FIG. 4). This processor of the SRUI SCS 43 is arranged to receive the request of the application server/application 1 for speech recognition. The processor, then, asks the call control CC 46 to ask the SSP 49 to set up a link between the party A and the SRUI SCS 43 via the SSP 49. After the SSP 49 has provided this link between the SRUI SCS 43 and party A, party A is requested to speak the name of party B. Of course, this name need not be the "real" name of party B. It can be any code or term under which party B is registered in a memory (not shown) of the SRUI SCS 43. Upon receiving the name of party B, SRUI SCS 43 translates the name of party B with its speech recognition function into the VPN-address of party B (VPN=Virtual Private Network). The VPN-address is sent by the SRUI SCS 43 to the requesting application server/application 1. Upon receiving the VPN-address, the application server/application 1 instructs the SRUI SCS 43 to release the connection with the SSP 49. To that end, the SRUI SCS 43 instructs the call control CC 46 to further instruct the SSP 49 to disconnect the speech channel between the SSP 49 and the SRUI SCS 43. Then, the application server/application 1 is able to route the call from party A to party B in accordance with prior art operations, since it is now knowing the VPN-address of the party B to be called.

The application server/application 1 may support known functions like divert, voice, etc.

IN IVR (Intelligent Network Interactive Voice Response) Embodiment

Figure 3:
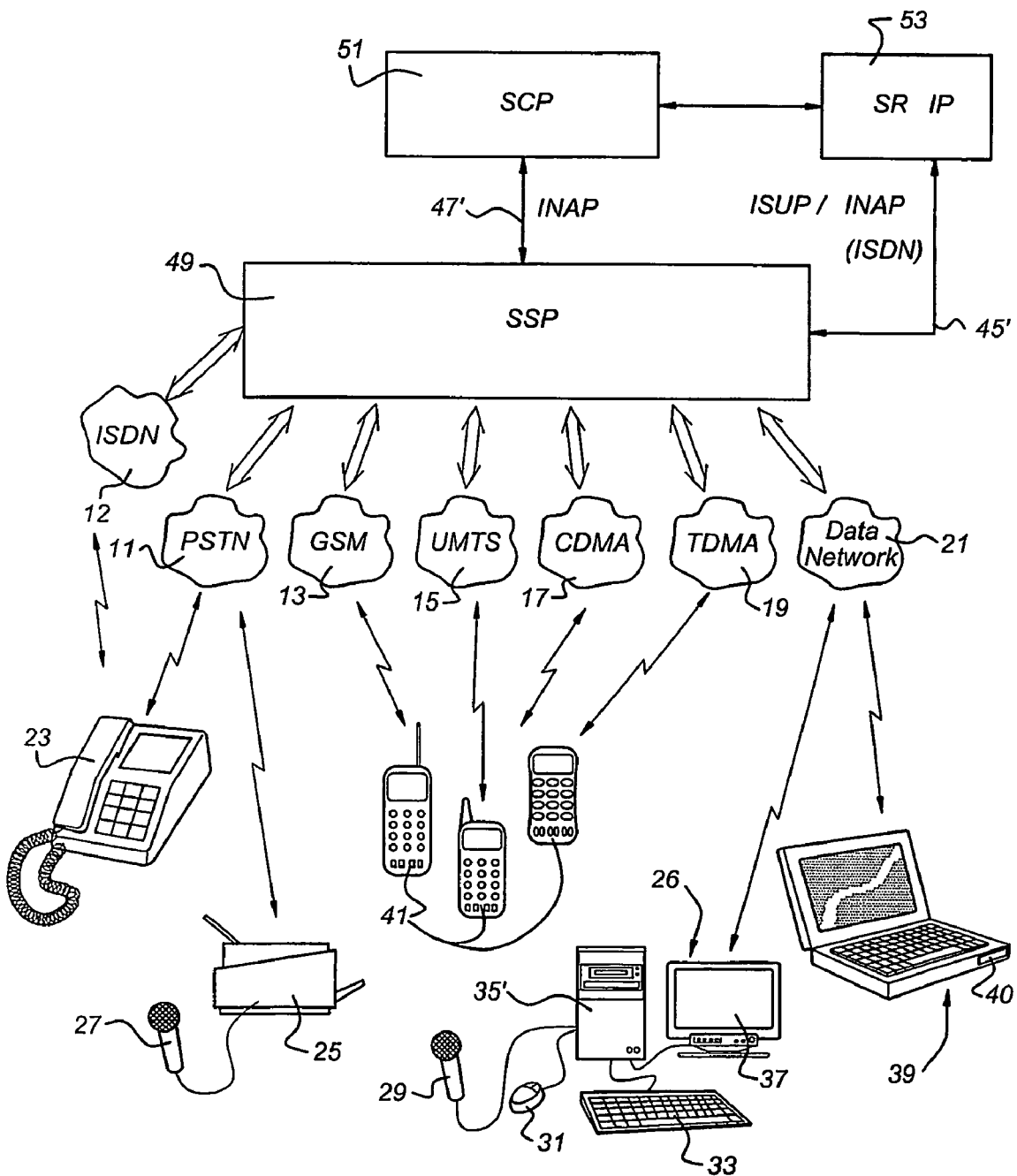

FIG. 3 shows a further embodiment of the present invention.

Like reference numbers in FIG. 3 as in FIGS. 1 and 2 refer to the same components. It is observed, that the personal computers 26 in FIGS. 2 and 3 are provided with a box 35' instead of a box 35 as in FIG. 1. This is just to show that the box 35 may be provided in the form of a tower.

The architecture shown in FIG. 3 comprises a Service Control Point 51 (SCP) and a Speech Recognition Intelligent Peripheral (SR IP) 53. The SSP 49 is connected to the SCP 51 via a connection 47'. Communication between the SSP 49 and the SCP 51 may be provided using the INAP (Intelligent.Network Application Protocol).

The SSP 49 is connected to the SR IP 53 via a connection 45'. Communications between the SSP 49 and the SR IP 53 may be provided using SUP, INAP or ISDN (ISUP=Integrated Services User Part; ISDN=Integrated Services Digital Network). A typical sequence of operations in accordance with the invention may be as follows. A party A desiring to call a party B notifies in some predetermined way to the SSP 49 that it likes to use speech recognition, instead of normal dialing. This may be done in any suitable way, as having Speech Recognition "always-on" and all calls from A are automatically directed to the Speech Recognition function via the SSP, or by having a special telephone number to reach the Speech Recognition function via the SSP. In the latter case, this telephone number could be programmed into the terminal of the user and be initiated by a short code or by just talking to the Speech Recognition function in the terminal ordering it to initiate the number to the Speech Recognition function in the network which initiates a connection to the SSP. The SSP sets up a Speech channel to the SR IF 53. After this speech channel is established between SSP 49 and the SR IF 53, the SR IF 53 notifies the party A that it can now speak the name of party B. The spoken name of party B is sent to the SR IP 53 through SSP 49 via connection 45'. The SR IP 53 translates the received spoken name of party B to the VPN-address of party B as stored in its memory (of FIG. 4). It then sends this VPN-address via the SSP to the SCP 51. Upon having sent this VPN-address, the SR IF 53 releases its speech channel with SSP 49. At this IVR embodiment according to the present invention (the main idea is that the SCP should not have to be changed when Speech Recognition is introduced), the SCP receives a VPN-number, and does not know if Speech Recognition was involved or if it was a normal dialing of the VPN number.

Then, SCP 51 is able to route the call of party A to party B in accordance with prior art techniques, since it now knows the VPN-address of party B.

The SCP 51 may support known functions like divert, voice mail, etc.

Figure 5:
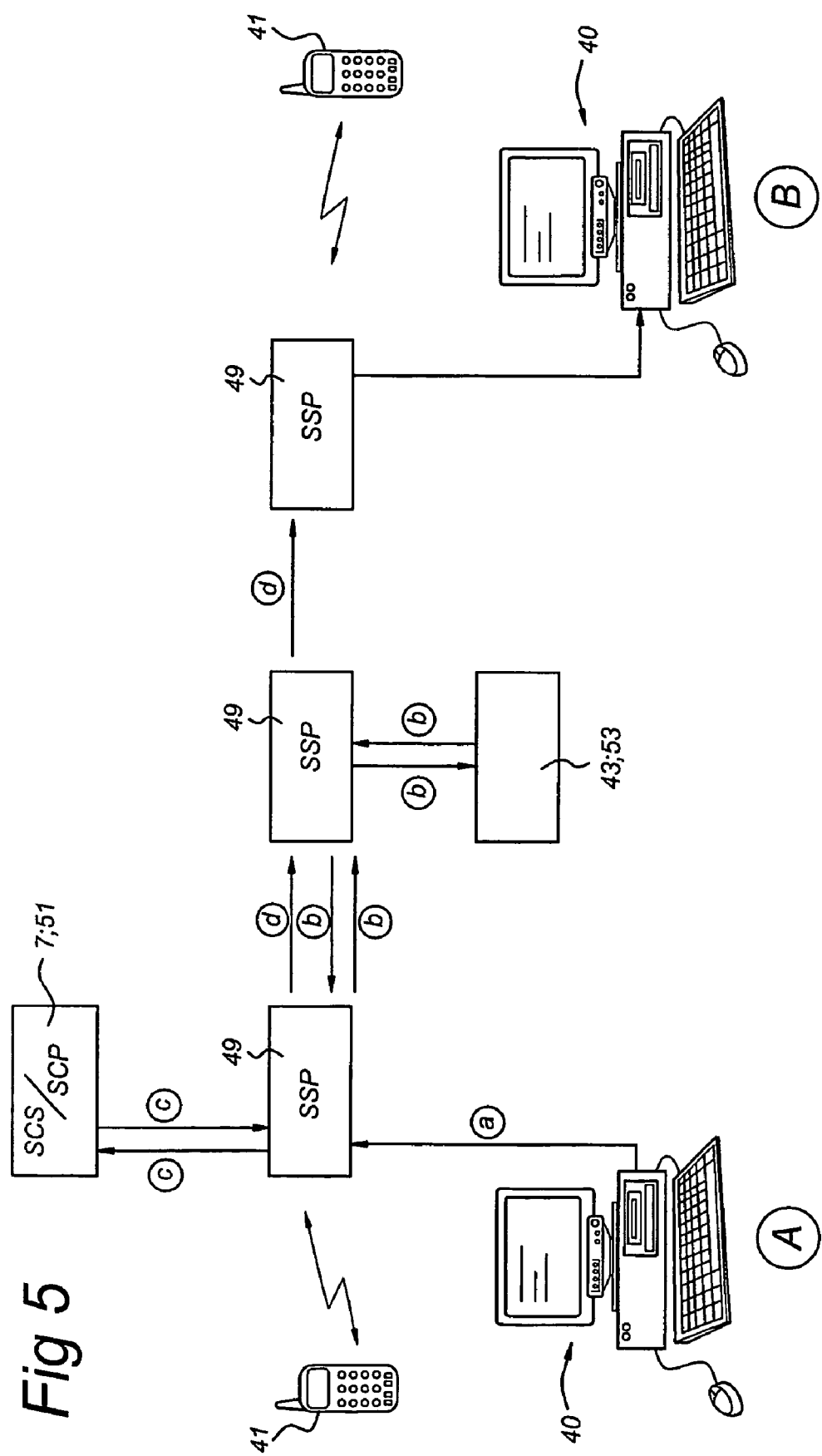
FIGS. 5 and 6 show alternative embodiments of the present invention.
Figure 6:
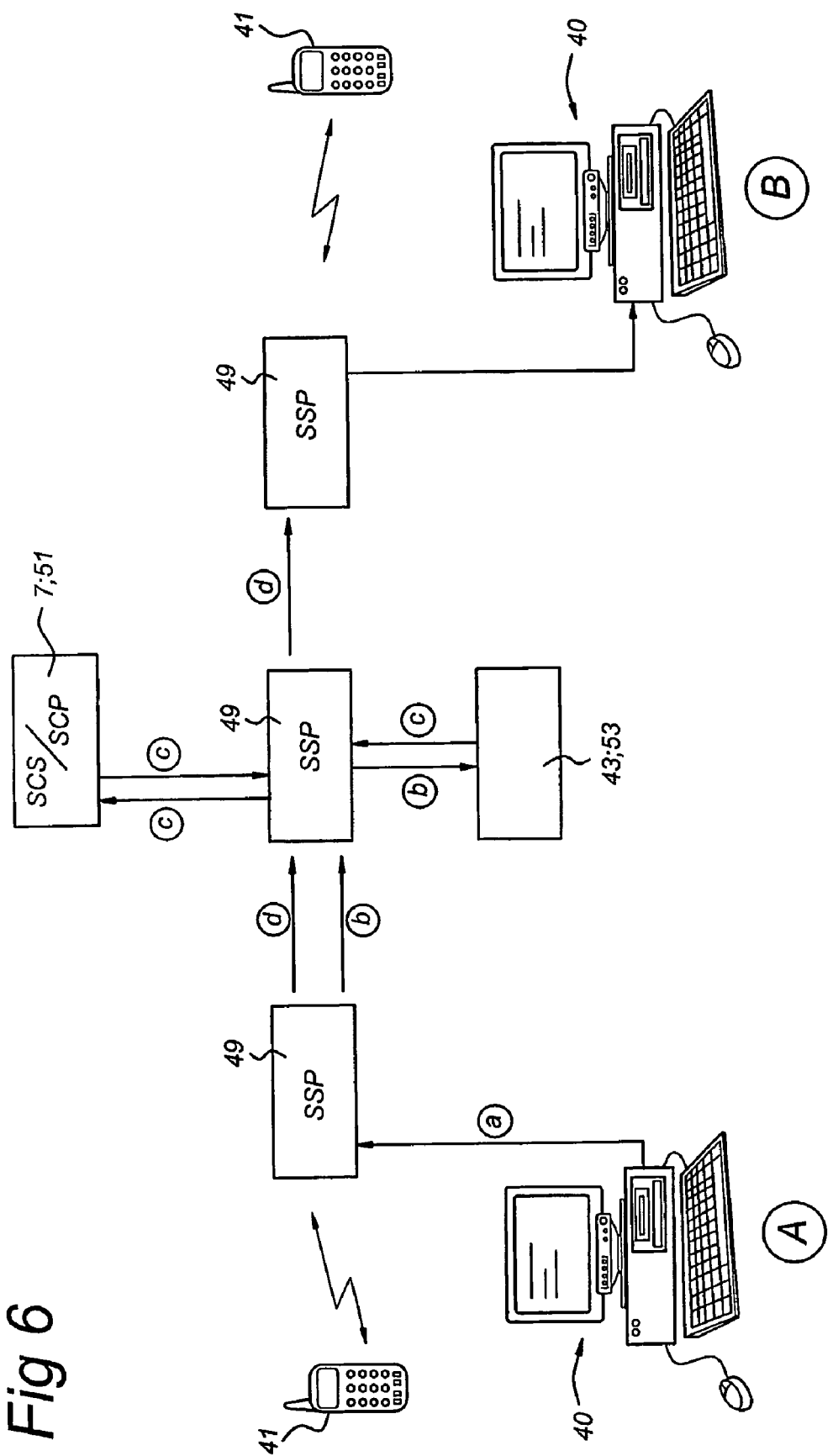

FIGS. 5 and 6 show alternative embodiments of the present invention. The same reference numbers in these figures as in the other figures refer to the same components/elements. FIGS. 5 and 6 show a party A with one or more telecommunications apparatuses (a mobile 41 and a personal computer 40 being shown) trying to establish a call with a party B with one or more telecommunications apparatuses (a mobile 41 and a personal computer 40 being shown) through a network with a plurality of switches SSP 49.

In the FIGS. 5 and 6 one box 7; 51 is shown to schematically indicate a location of an SCS or an SCP, respectively. Another box 43; 53 is shown to schematically indicate the location of the intelligent peripheral.

In FIG. 5, the SCS/SCP 7; 51 is connected to another switch SSP 49 than in FIG. 6. In FIG. 5, the SCS/SCP 7; 51 is connected to the same switch SSP that is communicating with party A, whereas the intelligent peripheral is connected to another switch SSP 49. In FIG. 6, the SCS/SCP 7; 51 is connected to the same switch SSP 49 as is the intelligent peripheral 43; 53.

In the arrangement according to FIG. 5, the following steps are performed to establish a call between party A and B (FIG. 5 shows steps a-d too):

(a) party A indicates in some way to the network that Speech Recognition in the network is to be used. This could be done in different ways, like pressing a short code on the mobile phone or the personal computer, speaking a word to the Speech Recognition function on the mobile phone or the personal computer or simply dialing a telephone number.

(b) One such action by party A results in a connection set up through the network from party A to the Speech Recognition function performed by intelligent peripheral 43; 53 in the network. After having talked to the SR, telling who or where he wants to call/mail, a translation is made of his spoken words to the corresponding IN address. This IN address is sent back to his own switch SSP 49 in the switching network.

(c) His switch SSP 49 now sends this IN address to the SCS/SCP 7; 51 as a standard IN request, including the identity and the location of party A. The SCS/SCP 7; 51 answers by sending the actual location or terminal of party B to the switch SSP 49.

(d) The switching network uses this new address to call B.

In the arrangement according to FIG. 6, the following steps are performed to establish a call between party A and B (FIG. 6 shows steps a-d too):

(a) party A indicates in some way to the network that Speech Recognition in the network is to be used. This could be done in different ways, like pressing a short code on the mobile phone or the personal computer, speaking a word to the Speech Recognition function on the mobile phone or the personal computer or simply dialing a telephone number.

(b) One such action by party A results in a connection set up through the network from party A to the Speech Recognition function performed by intelligent peripheral 43; 53 in the network. After having talked to the SR, telling who or where he wants to call/mail, a translation is made of his spoken words to the corresponding IN address.

(c) This IN address is sent directly to the SCS/SCP 7; 51 via their common switch SSP 49 in the switching network as a standard IN request, including the identity and the location, of party A. The SCS/SCP 7; 51 answers by sending the actual location or terminal of party B to the common switch SSP 49.

(d) The switching network uses this new address to call B.

Another example of services: Speech recognition in UPT VPN, Freephone, Premium Rate or any other IN service. The present invention may provide for speech recognition in UPT ( ), for a Freephone, a Premium Rate etc in an easy way.

By its nature, Speech Recognition (SR) will always fail in some cases. All systems fail sometimes and the strength of a system is how it handles those failures. Therefore the key question for SR (like any other system) is to find applications, which compensate for that fact. If an application can be found where the probability of SR failure is of the same small magnitude, or less, as other failure, due to technical reasons, user mistakes etc, the SR is of no problem. But, to be confident with SR, it is always good to have a backup alterative, just in case. (See below)

EXAMPLE

SR for initiation of a communication to a person by using name, for addressing email or initiating calls by phone or addressing Home pages, has many advantages:
One does do not have to remember email-addresses, telephone numbers or web-addresses. One verbal address, the name, complemented by the way of communication is enough and easier to remember, e. g.:
"Nils Jonsson by email"
"Karl Svensson by phone"
"John Svensson by SMS"
"Home page of Lars Qisson"
The service works without having to be changed independent of the person changing his/her
actual geographical place
computer/phone used for the moment
web-/email-/phone-/facsimile-address
One only has to say his/her name as usual.
Voice activated services provides a hands-free alternative that allows use of mobile phones much more secure when driving.

Name is better than numbers from the SR perspective. Numbers can be of the length of 10-12 digits, all independent of each other, i.e. after one digit comes another that, from addressing perspective, is not related to the preceding one. When using a name that is different. First, mostly, there are only two words (instead of 10-12) to remember and for the SR system to understand. Secondly, the first and the last name are dependent on each other, which is a clear advantage if the number of persons in the directory is small, like in a VPN or in a Centrex group. VPN/Centrex are mainly used within an organization/a company.

Typically, characteristics on the VPN service are, that it:
is speaker independent
has a limited vocabulary compared with the public network
has single words or words that are dependent on each other
Further requirements could be added:
limited number of words to speak when using the service
logical sequence (like, after a given name comes a family name) or a good menu to follow.

This is the reason why VPN or Centrex (which is similar to VPN) is a good choice as a first service example for SR, preferably a VPN or Centrex of a maximum of 500 persons.

The benefits of Name Addressing in a VPN/Centrex is understood better with the following example:

During a Name Addressing in a company of 500 persons the SR system happens to understand the last name, e.g. "Karlsson" correctly but is in doubt of the first name. Was it "Jan", "John" or "Johan"? However, as there is a person in the directory, "John Karlsson" but no "Jan Karlsson" or "Johan Karlsson" the first name has to be "John".

So, even if one word is not understood exactly by the SR system, it can often in a VPN/Centrex draw an intelligent conclusion and still find the right person.

Impact of Introduction of SR Services

Systems with a SR interface will sometimes fail, that is an axiom, which has to do with the nature of SR and the use of voice by the human beings.

What really is of interest when launching a service to the customer is not only the SR quality, it is the whole total solution that is important, that is how the situation is handled when SR fails. People can accept that SR fails some times (also telephone systems like GSM fails, not to mention the Internet). What is of importance is how the solution to handle the failure works. It is important that a backup exists and that the turnover to this feels smooth for the customer.

The use of SR within a VPN or within a Centrex-group increases the hit-rate, as the vocabulary is limited. The number of persons with the same or with similar names are simply less than in the public network. And for combinations of given names and family name it is even more true.

VPN and SR from the User Perspective

Here, it is described how a user in future can be able to use SR for reaching another person within the same company (the same VPN). The idea is that the user initially indicates in some way from his/her Computer/Mobile telephone/fixed phone to a network that speech is to be used. It can be done by a certain telephone number to the Name Addressing service, which could be inserted as a voice demand inserted in the terminal or as a short code. The network connects the user to the SR-device (the IP 43, 53), which is directly connected to the directory of the company. Then the user gets a response that there is an SR ready to listen to him/her. The user simply says the name of the one he/she wants to reach and also indicates the wanted type of communication, like "Lars Svensson by phone" or "Lars Svensson by mail". The SR system identifies in the first case the name and looks up the phone number of Lars Svensson in the directory, which shows where he wants to be reached (which terminal) for the moment and connects the user to that telephone number. If the user said "Lars Svensson by email", the email number of Lars Svensson was fetched from the directory and an email is sent.

It is important to smoothly handle situations where more than one person have the same name. The usage must feel natural for the user. For instance, when the system finds that there are two or more persons named "Lars Olsson", it can ask the user:

"Do you mean Lars Olsson in the sales department or Lars Olsson in the design department?" If it happens that two "Lars Olsson" works in the sales department, the system can ask: "Do you mean Marketing Director Lars Olsson or Asia Sales responsible Lars Olsson?"

What is preferred in all man-machine dialogues is that the response time from the machine never exceeds 2 seconds. There is a huge risk that the user loses his interest in the current dialogue and if this repeats a couple of times the user could easily lose interest in the service or, even worse, the whole SR risks to get a bad reputation.

SR addressing has its clear advantages in some situations when it is difficult to use push buttons, like when driving and walking. Especially in the car, the usage of SR could minimise the risk of accidents. Also when dark, the use of the voice is superior to other ways of handing a terminal.

But there are also situations and places where SR addressing should be avoided. Best example is sending of a mail when being at the theatre.

The embodiments shown in FIGS. 2 and 3 show that the speech recognition function provided by the invention is just an option. If the user does not wish to use the speech recognition offered by the SRUI SCS 43 or SR IP 53, respectively, he can simply make a direct call using the keys of his telecommunication apparatus. It is evident that the application of SRUI SCS 43 or SR IP 53 provides a simple solution to existing networks. The existing networks are still allowed to work with VPN-addresses of parties to be called. In the embodiment shown in FIG. 3, SCP 51 receives the VPN-address of party B and can operate in the same way as it is used to operate without speech recognition. The same is true for the embodiment of FIG. 2. In the embodiment of FIG. 2, it is the application server/application 1 which is still able to operate with the VPN-address of party B to be called by party A since it receives the VPN-address from the SRUI SCS 43 that performs the speech recognition function required.

There are several backup possibilities if the speech recognition to be provided by SRUI SCS 43 or SR IP 53 fails. One possible backup option after failure of the speech recognition function is, that the application server/application 1 informs the telecommunication apparatus of party A that the speech recognition has failed. This information may be provided either by a simulated voice message or a message in the display of the telecommunication apparatus.

Another backup possibility is that, if the telecommunication apparatus is a GSM or a DTMF fixed telephone, party A is requested to enter the name of party B by using the keys of the GSM or the DTMF fixed telephone to produce DTMF code that can be recognized by the SRUI SCS 43 or the SR IP 53, respectively.

Another option is that, if the telecommunication apparatus is a personal computer, party A is requested to simply key in the name of party B by means of keyboard 33.

A final fall back position is that party A is connected to an operator of the application server/application 1 or the SCP 51, respectively.

Intelligent Peripheral

Both the SRUI SCS 43 and the SR IP 53 can be seen as an intelligent peripheral providing the services as defined earlier. FIG. 4 shows that the intelligent peripheral 43, 53 is provided with a processor 55 and a memory 57, connected to the processor 55.

The processor 55 is arranged with suitable connections to communicate with the other devices shown in the FIGS. 2, 3. This may be done in any way known to persons skilled in the art. The connections may be either fixed or wireless. The memory 57 may, as the case may be, be provided with one or more of the following memory units: hard disc, ROM (Read Only Memory), RAM (Random Access Memory) and EEPROM (Electrically Erasable Programmable Read Only Memory). Of course, other types of memory units may be provided. The processor 55 may be implemented as a plurality of processors, as the case may be.

Of course, the SRUI SCS 43 and SR IP 53 may be connected to other units (e.g., processors, memories, etc.).

The memory 57 stores VPN-addresses of a set of persons, personal functions, specific terminals or services. The memory 57 also stores instructions to provide the processor 55 with the required SR (and IVR) capacity.

OTHER EXAMPLES

Examples of deployment of (intelligent peripheral based) IVR within IN Services:
 Integration of calling card services and corporate VPN.
 Additional security features (e.g. speaker verification)
 Corporate client automated directory services
 Voice activated dialing with personal phonebook
 Speech activated account recharge
 Speech recognition can enhance the effectiveness of call routing in Information and Business services.
 Speech recognition technology can be integrated into IVR platforms. E.g. call centre and AST-DR (Announcement Service Terminal, Digital Recording).

Speaker Verification

This future feature, where a person is identified by his/her voice will, will simplify the authentication process, bringing benefits in user acceptance and satisfaction—"easy of use". Speaker Verification is used in some applications today, but is still too uncertain to use as the only identification tool (e.g. when collecting money in the cash dispensing machine), but it is sure of interest for the future.

Internet Services

Accessing information from the WEB by voice—"talking to the WEB"

Location Based Server

Speech Recognition and Location based services, e.g. to find the closest petrol station or restaurant, dentist etc, is starting up today, and this combination is very interesting to further develop in future.

Portals

Accessing a whole range of services using voice as an alternative interface Speech control to, e.g., WAP based services provides an alternative access. It is not always possible to read a message (drivers) and not all mobiles are WAP compatible (yet).

For some applications a direct voice command is quicker and more convenient than keying in the name or browsing. (E.g. a name of a stock, which is not listed on a personal list of stock, is easier pronounced than written).

Blue-tooth will further stress the importance of voice access, simply because the mobile device could be out of eyesight.—And it will, that is one of the strengths with Bluetooth.

The invention claimed is:

1. An intelligent peripheral for speech recognition comprising a processor and a memory connected to the processor and storing a list of Virtual Private Network (VPN) addresses of at least one of a set of persons, personal functions, specific terminals and services as well as instructions to control the processor, wherein the VPN addresses include at least one of the following sets: fixed telephone addresses, mobile telephone addresses, e-mail addresses, facsimile addresses, the processor being arranged to:
   communicate with a network apparatus arranged to control a switch in a telecommunication network;
   communicate with the switch; and
   perform the following operations controlled by the instructions:
      receive a call from the switch, to establish a communication channel with the switch and to receive a demand to be able to receive a speech instruction;
      receive from a first telecommunication apparatus the speech instruction associated with a VPN number that is associated with either a person, personal function, second telecommunication apparatus or service desired to be called or noticed by the first telecommunication apparatus;
      recognize an additional spoken instruction indicating in which set of the at least one of a set of persons, personal functions, specific terminals and services that the VPN-address is stored;
      translate the speech instruction into a VPN address associated with either the person, personal function, second telecommunication apparatus or service and send the VPN address to the network apparatus, the VPN address having a predetermined format in accordance with a protocol used in the telecommunication network in which the intelligent peripheral is to be operated;
      transfer at least the VPN address, as well as the identity and current location of the first telecommunication apparatus to the switch for transfer to the switch to the network apparatus as a standard Intelligent Network (IN) request; and
      release the communication channel with the switch.

2. The intelligent peripheral according to claim 1, wherein the processor is arranged to notify the first telecommunication apparatus with a welcome message that the intelligent peripheral is ready and waiting for the speech instruction.

3. The intelligent peripheral according to claim 1, wherein the VPN addresses include at least one of the following sets: fixed telephone addresses, mobile telephone addresses, e-mail addresses, and facsimile addresses.

4. The intelligent peripheral according to claim 3, wherein the processor is arranged to recognize an additional spoken instruction indication in which set the VPN address is stored.

5. A telecommunication network comprising
   an intelligent peripheral comprising:
      a processor and a memory connected to the processor and storing a list of Virtual Private Network (VPN) addresses of at least one of a set of persons, personal functions, specific terminals and services as well as instructions to control the processor, wherein the VPN addresses include at least one of the following sets: fixed telephone addresses, mobile telephone addresses, e-mail addresses, facsimile addresses, the processor being arranged to:
         communicate with a network apparatus arranged to control a switch in a telecommunication network;
         communicate with the switch; and
         perform the following operations controlled by the instructions:
            receive a call from the switch, to establish a communication channel with the switch and to receive a demand to be able to receive a speech instruction;
            receive from a first telecommunication apparatus the speech instruction associated with a VPN number that is associated with either a person, personal function, second telecommunication apparatus or service desired to be called or noticed by the first telecommunication apparatus;
            recognize an additional spoken instruction indicating in which set of the at least one of a set of persons, personal functions, specific terminals and services that the VPN address is stored;
            translate the speech instruction into a VPN address associated with either the person, personal function, second telecommunication apparatus or service and send the VPN address to the network apparatus, the VPN address having a predetermined format in accordance with a protocol used in the telecommunication network in which the intelligent peripheral is to be operated;
            transfer at least the VPN address, as well as the identity and current location of the first telecommunication apparatus to the switch for transfer to the switch to the network apparatus as a standard Intelligent Network (IN) request; and
            to release the communication channel with the switch; and
   a first switch connected to the intelligent peripheral; and
   a second switch connected to the network apparatus, the network apparatus being arranged to control the second switch.

6. The telecommunication network of claim 5, wherein the network apparatus is arranged to control the intelligent peripheral.

7. The telecommunication network of claim 5, arranged to support the following operations:
   by the intelligent peripheral:
      to receive a call from the first switch, establish a communication channel with the first switch and to receive a demand to be able to receive a speech instruction;
      to receive from a first telecommunication apparatus the speech instruction associated VPN number associated with either a person, personal function, second telecommunication apparatus or service desired to be called or noticed by the first telecommunication apparatus;
      to translate the speech instruction into a VPN address associated with either the person, personal function, second telecommunication apparatus or service and send the VPN address to the network apparatus, the VPN address having a predetermined format in accordance with a protocol used in the telecommunication network in which the intelligent peripheral is to be operated;

to transfer at least the VPN address, as well as the identity and current location of the first telecommunication apparatus to the first switch; and to release the communication channel with the switch; and by the network apparatus, to receive from the first switch a standard IN request based on the VPN address to establish a current address of the person, personal function, specific terminal or service and to send it to the first switch to establish the connection between the first and second telecommunication apparatuses.

8. The telecommunication network of claim 7, arranged to support at least one of a UPT-service, a 3G-service, Freephone, Premium rate, Credit Call, Credit Card call, and Televoting.

9. The telecommunication network of claim 7, wherein the network apparatus is arranged to translate the VPN address into another VPN address where a user of the VPN address can be reached temporarily.

10. The telecommunication network of claim 7, wherein the network apparatus is arranged to provide at least one of the following fall back options if the intelligent peripheral fails to provide the VPN address:

requesting a user of the first telecommunication apparatus to provide the VPN address; and requesting the user of the first telecommunication apparatus to provide the spoken name again by either Dual Tone Multi-Frequency (DTMF) codes or by using a keyboard.

11. The telecommunication network of claim 7, wherein the network apparatus comprises a service capability server arranged to control the first switch, and at least one application server connected to the service capability server, the intelligent peripheral being also connected to the service capability server and the application server.

12. The telecommunication network of claim 7, wherein the network apparatus comprises a service control point (SCP) arranged to control the first switch, the intelligent peripheral also being connected to the service control point.

13. A method to provide speech recognition by an intelligent peripheral provided with a processor and a memory connected to the processor and storing a list of Virtual Private Network (VPN) addresses of at least one of a set of persons, personal functions, specific terminals and services as well as instructions to control the processor, wherein the VPN addresses include at least one of the following sets: fixed telephone addresses, mobile telephone addresses, e-mail addresses, facsimile addresses, the processor being arranged to communicate with a network apparatus that is arranged to control a switch in a telecommunication network and communicate with the switch;

the method comprising the following operations controlled by the intelligent peripheral:

to receive a call from the switch, to establish a communication channel with the switch and to receive a demand to be able to receive a speech instruction;

to receive from a first telecommunication apparatus the speech instruction associated with a VPN number that is associated with either a person, personal function, second telecommunication apparatus or service desired to be called or noticed by the first telecommunication apparatus;

to recognize an additional spoken instruction indicating in which set the VPN address is stored;

to translate the speech instruction into a VPN address associated with either a person, personal function, second telecommunication apparatus or service and send the VPN address to the network apparatus, the VPN address having a predetermined format in accordance with a protocol used in the telecommunication network in which the intelligent peripheral is to be operated;

to transfer at least the VPN address, as well as the identity and current location of the first telecommunication apparatus to the switch in order to be transferred by the switch to the network apparatus as a standard Intelligent Network (IN) request; and to release the communication channel with the switch.

14. A method in a telecommunication network comprising the steps of:

a intelligent peripheral associated with the telecommunication network:

receiving a call from a first switch, establishing a communication channel with the first switch and receiving a demand to be able to receive a speech instruction;

receiving from a first telecommunication apparatus a speech instruction associated with a Virtual Private Network (VPN) number that is further associated with a person, personal function, second telecommunication apparatus or service desired to be called or noticed by the first telecommunication apparatus;

translating the speech instruction into a VPN address associated with either the person, personal function, second telecommunication apparatus or service and sending the VPN address to a network apparatus, the VPN address having a predetermined format in accordance with a protocol used in the telecommunication network in which the intelligent peripheral is to be operated;

transferring at least the VPN address, as well as the identity and current location of the first telecommunication apparatus to the first switch;

releasing the communication channel with the first switch;

the network apparatus:

receiving from the first switch a standard IN request based on the VPN address to establish a current address of the person, personal function, second telecommunication apparatus or service and sending the current address to the first switch to establish the connection between the first telecommunication apparatus and the person, personal function, second telecommunication apparatus or service.

15. A computer program product within a computer usable medium associated with an intelligent peripheral in a network, the computer program product comprising:

instructions within the computer usable medium for receiving a call from a first switch, establishing a communication channel with the first switch and receiving a demand to be able to receive a speech instruction;

instructions within the computer usable medium for receiving from a first telecommunication apparatus a speech instruction associated with a Virtual Private Network (VPN) number that is further associated with a person, personal function, second telecommunication apparatus or service desired to be called or noticed by the first telecommunication apparatus;

instructions within the computer usable medium for translating the speech instruction into a VPN address associated with either the person, personal function, second telecommunication apparatus or service and sending the VPN address to a network apparatus, the VPN address having a predetermined format in accordance with a protocol used in the telecommunication network in which the intelligent peripheral is to be operated;

instructions within the computer usable medium for transferring at least the VPN address, as well as the identity and current location of the first telecommunication apparatus to the first switch;

instructions within the computer usable medium for releasing the communication channel with the first switch; and instructions within the computer usable medium for the network apparatus receiving from the first switch a standard Intelligent Network (IN) request based on the VPN address to establish a current address of the person, personal function, second telecommunication apparatus or service and sending the current address to the first switch to establish the connection between the first telecommunication apparatus and the person, personal function, second telecommunication apparatus or service.

16. A data carrier comprising a computer program product within a computer usable medium associated with an intelligent peripheral in a network, the computer program product comprising:

instructions within the computer usable medium for receiving a call from a first switch, establishing a communication channel with the first switch and receiving a demand to be able to receive a speech instruction;

instructions within the computer usable medium for receiving from a first telecommunication apparatus a speech instruction associated with a Virtual Private Network (VPN) number that is further associated with a person, personal function, second telecommunication apparatus or service desired to be called or noticed by the first telecommunication apparatus;

instructions within the computer usable medium for translating the speech instruction into a VPN address associated with either the person, personal function, second telecommunication apparatus or service and sending the VPN address to a network apparatus, the VPN address having a predetermined format in accordance with a protocol used in the telecommunication network in which the intelligent peripheral is to be operated;

instructions within the computer usable medium for transferring at least the VPN address, as well as the identity and current location of the first telecommunication apparatus to the first switch;

instructions within the computer usable medium for releasing the communication channel with the first switch; and instructions within the computer usable medium for the network apparatus receiving from the first switch a standard Intelligent Network (IN) request based on the VPN address to establish a current address of the person, personal function, second telecommunication apparatus or service and sending the current address to the first switch to establish the connection between the first telecommunication apparatus and the person, personal function, second telecommunication apparatus or service.

* * * * *

UNITED STATES PATENT AND TRADEMARK OFFICE
CERTIFICATE OF CORRECTION

PATENT NO. : 7,606,713 B2 Page 1 of 1
APPLICATION NO. : 10/525586
DATED : October 20, 2009
INVENTOR(S) : Thorner It is certified that error appears in the above-identified patent and that said Letters Patent is hereby corrected as shown below:

In Column 2, Lines 29-30, after "peripheral" delete "as claimed in claim 1".

In Column 5, Line 15, delete "Network)" and insert -- Network); --, therefor.

In Column 7, Line 61, delete "(Intelligent." and insert -- (Intelligent --, therefor.

In Column 7, Line 65, delete "SUP," and insert -- ISUP, --, therefor.

In Column 8, Line 14, delete "SR IF" and insert -- SR IP --, therefor.

In Column 8, Line 16, delete "SR IF 53, The SR IF" and insert -- SR IP 53, The SR IP --, therefor.

In Column 8, Line 22, delete "SR IF" and insert -- SR IP --, therefor.

In Column 9, Line 42, delete "alterative," and insert -- alternative, --, therefor.

In Column 9, Line 56, delete "SMS" and insert -- SMS" --, therefor.

In Column 9, Line 57, delete "Qisson"" and insert -- Olsson" --, therefor.

In Column 11, Line 29, delete "handing" and insert -- handling --, therefor.

Signed and Sealed this

Ninth Day of November, 2010

David J. Kappos
*Director of the United States Patent and Trademark Office*